Nov. 6, 1962   D. L. DRUKEY ET AL   3,063,040
TRANSDUCING METHOD AND SYSTEM
Filed Jan. 13, 1958   3 Sheets-Sheet 1

Donald L. Drukey
Jack H. Irving
Dean E. Wooldridge
INVENTORS

BY Albert Rosen
Morris Spector
ATTORNEYS

Nov. 6, 1962

D. L. DRUKEY ET AL 3,063,040

TRANSDUCING METHOD AND SYSTEM

Filed Jan. 13, 1958

Donald L. Drukey
Jack H. Irving
Dean E. Wooldridge
INVENTORS

BY Albert Rosen
Morris Spector
ATTORNEYS

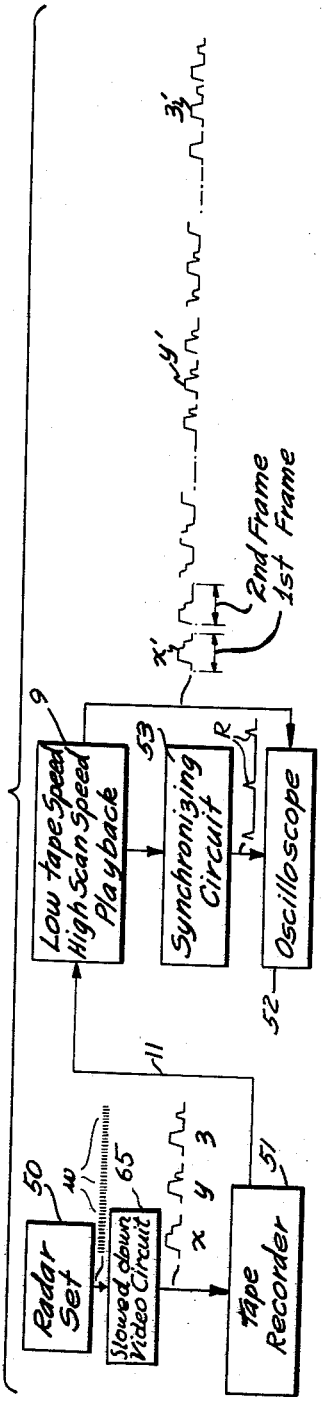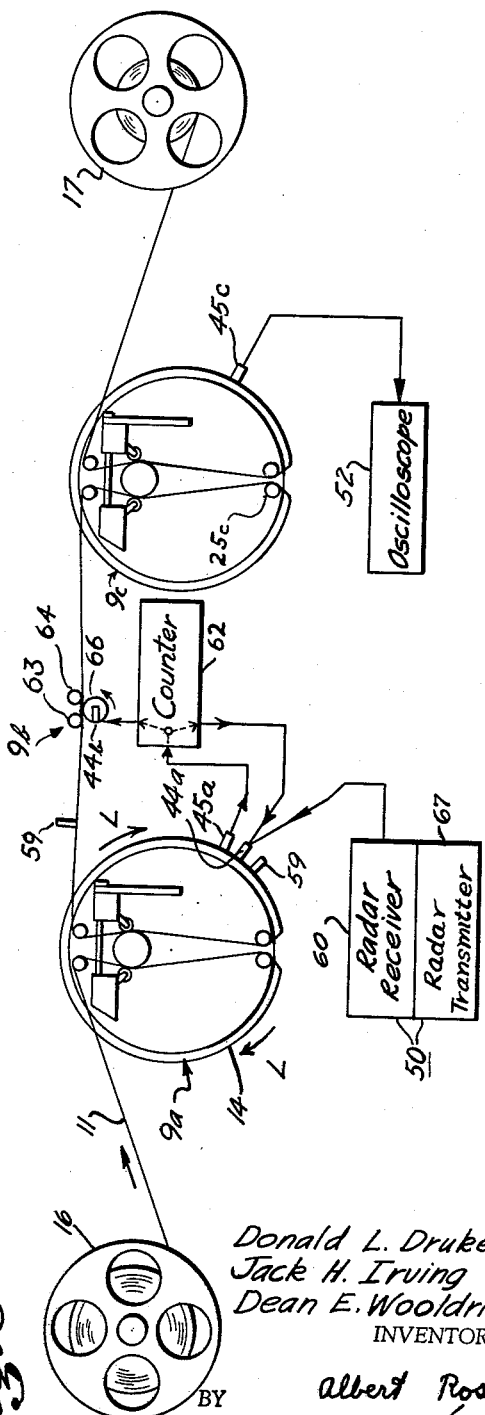
Fig. 4
Fig. 5
Donald L. Drukey
Jack H. Irving
Dean E. Wooldridge
INVENTORS
BY Albert Rosen
Morris Spector
ATTORNEYS

United States Patent Office 3,063,040
Patented Nov. 6, 1962

3,063,040
TRANSDUCING METHOD AND SYSTEM
Donald L. Drukey, Manhattan Beach, and Jack H. Irving and Dean E. Wooldridge, Los Angeles, Calif., assignors, by mesne assignments, to Thompson Ramo Wooldridge Inc., Cleveland, Ohio, a corporation of Ohio
Filed Jan. 13, 1958, Ser. No. 708,624
The terminal six months of the term of said patent is hereby dedicated to the Public
17 Claims. (Cl. 340—174.1)

This invention relates to methods and systems for the visual display of signals. In particular, the invention concerns systems that make use of recording apparatus for providing a bright display of weak, random, or low repetition rate signals.

It is often desirable to present as a bright display signals representative of low repetition rate phenomena (e.g., a radar picture) or of random transient phenomena (e.g., noise analysis or rupture analysis in mechanical testing). However, the usual approaches to this problem have not proven entirely satisfactory. For example, in radar the repetition rate of the received radar signal or sweep is usually so low that only one small portion of a radar sweep is brightly displayed on an oscilloscope screen at one time, the other portions of the radar sweep fading while the one portion is displayed. In the display of random transient phenomena the problem of providing a bright, continuous display becomes even more acute. Also, in certain repetitive phenomena, such as in the radar signals aforementioned, the signal to noise ratio is often so low that the information signal is lost. This is especially true when the noise level is higher than the information signal level.

Accordingly, one object of the invention is the provision of an improved method and system for the visual presentation of weak, random, or low repetition rate phenomena.

Another object is the provision of an improved method and means for selecting an information signal from background noise when the noise level is of the same order as, or exceeds, the information signal level.

It is a further object to provide an improved method and system for presenting a bright, continuous display of received radar information notwithstanding the fact that noise or interference signals may be present and may have a greater amplitude than the information signal.

According to the method and system of the invention weak, random transient, or low repetition rate phenomena are presented as a uniformly bright, continuous, visual display. This is accomplished by recording on magnetic tape signals representative of the phenomena to be displayed, playing back the recorded signals on a playback mechanism of a type in which the playback head is movable independently of the tape for scansion of a portion of a continuous length of tape, and presenting the played back signals to a display device such as a cathode ray oscilloscope. Each scansion of the tape portion by the playback head is chosen to correspond in time to one picture frame on the display screen of the device. Thus, when the tape is slowly moved through the playback mechanism the display will move across the display screen at a rate of speed proportional to the speed of the tape.

According to another embodiment a novel recording integrator is provided. This recording integrator is used to present as a bright display the information content of signals representative of repetitive phenomena having a random noise content, such as weak radar receiver signals. The resultant display has a very low noise level even when the noise level in the original signal is higher than the information signal level. The foregoing is realized by recording on recording medium such as magnetic tape the first of a number of cycles of the phenomena to be presented (e.g., in the case of pulse radar a cycle may be the signal received in the time interval between successive transmitted pulses). This first cycle is then read out at the same time that the second cycle of information is arriving. The two cycles are electronically added, either as analog signals or as digitally coded information, and the sum is then recorded on the magnetic tape. This recorded sum is then read out for addition to the third cycle. This process is repeated until the desired number of cycles have been integrated. Since the information content will have a repeating pattern from cycle to cycle, the information signal will build up at a faster rate than the noise signal which occurs at random time intervals. Thus, a high amplitude information signal may be created from radar signals having a random noise level higher than the information signal level.

In one embodiment the integration by recording is realized in a novel recirculating register in which moving magnetic recording and playback heads contact the tape, and wherein information read by the playback head is re-recorded by the recording head. Notwithstanding the contact scansion, the tape has a very long life since new tape is constantly being fed into the register. This contact scansion of tape by the heads makes for increased information storage without an increase in access time.

In the drawing, wherein like reference characters refer to like parts:

FIGURE 4 is a block diagram of a system for presenting signals as a bright, continuous display on the screen of a cathode ray oscilloscope; and FIGURE 5 is a partially schematic diagram of a system for discriminating against random noise in a repetitive information signal, and displaying the resultant, substantially noise-free signal on the screen of a cathode ray oscilloscope.

Since one of the more important embodiments of the method and system of the invention makes use of a particular type of magnetic tape recording and playback apparatus, the apparatus will be described before the method and system are explained in detail. The type of apparatus referred to makes use of magnetic transducing means in the form of magnetic recording (or playback) heads that rotate at a high velocity about a portion of a continuous length of magnetic tape on which a signal is recorded.

*Apparatus Used in Practicing the Invention*

Figure 1:
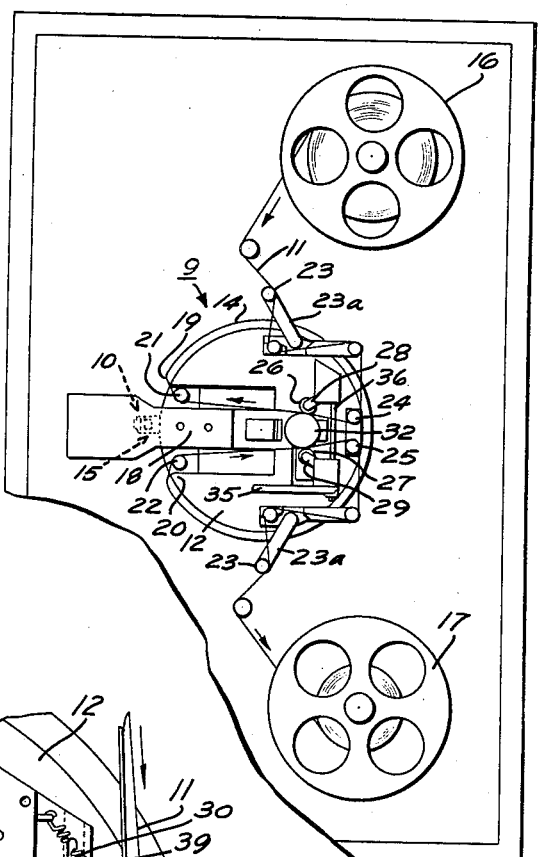
FIGURE 1 is a plan view of apparatus used in practicing the invention.

As illustrated in FIGURE 1, the magnetic recording and playback apparatus 9 comprises a transducing assembly 10, to be described, mounted for continuous, high velocity rotation in a circular path about magnetic tape 11. The tape 11 is supported in an arcuate path around the periphery of a support disk 12 and adjacent to the path of travel of the assembly 10 for scansion by it. The tape 11 is continuously fed to the periphery or outside surface 14 of the support disk from a position outside of the plane of rotation of the assembly 10 so that the tape may be continuously fed to scanning position around the disk without interfering with the rotation of the assembly. If the tape 11 is slowly advanced in the arcuate path during the scansions, successive portions of the tape are scanned at high velocity while the tape itself is moving at a low velocity. If the tape is maintained stationary during the rotation of the assembly, one tape portion is subjected to repeated scansion. Consequently, the relative velocity between the transducing assembly 10 and tape 11 may be made as low as desired, or as high as several thousand inches per second. As will be explained in connection with FIGURES 4 and 5, the repeated scansions of a recorded signal are presented to a cathode ray oscilloscope having a sweep synchronized with the rotation of the transducing assembly 10. The oscilloscope thus presents a continuous, bright, graphical presentation of the signal recorded on the portion of tape being scanned.

As shown in FIGURE 1, the magnetic transducing assembly 10 is fixed to an arm 15 mounted for rotation about the cylindrical outside surface 14 of the disk 12 so that as the arm 15 rotates the transducing assembly 10 scans the tape. The tape 11 is threaded from a tape supply reel 16, around and along the outside or tape support surface 14 of the disk 12, and then to a take-up reel 17. As will be explained, the movement of the tape 11 along the surface 14 is effected in such a manner as to avoid interference with the rotation of the arm 15 around the surface.

Figure 3:
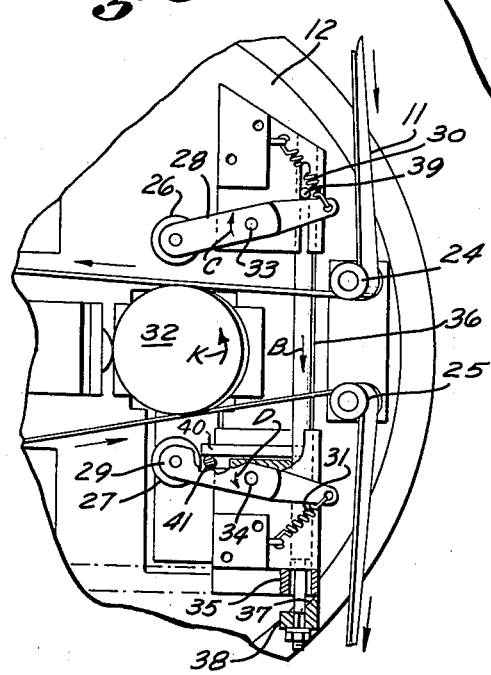
FIGURE 3 is an enlarged fragmentary view of a tape clamping mechanism of the apparatus of FIGURE 1 in an "open" position.

The apparatus 9 of FIGURE 1 is described in greater detail in connection with FIGURES 2 and 3. The support disk 12, fixed to a frame 18 (shown in FIGURE 1) has a cylindrical tape support surface 14 that extends through about 300 degrees of a circle. The support disk 12 is provided with entrance and exit portions, 19 and 20 respectively, through which the magnetic tape 11 is fed onto and off of the support surface 14. A first set of tape guiding pulleys 21 and 22, positioned adjacent to the entrance and exit portions 19 and 20, are each canted to one side so that magnetic tape 11 may be fed by the pulleys onto and off of the disk surface 14 from a position to one side of the plane of the disk. A second set of tape guiding pulleys 24 and 25 are positioned on the side of the disk 12 remote from the first set of pulleys 21 and 22 to better enable the passage of the tape to the disk surface from the aforementioned position on one side of the plane of the disk. The second set of pulleys 24 and 25 are each canted in the same direction as that of the first pulleys 21 and 22 to guide the tape back into a plane parallel to, but spaced from, the plane of the disk 12. The cant of each of the pulleys 24 and 25 in the second set is illustrated in FIGURE 3. The second set of pulleys 24 and 25 guides the tape 11 from and to, respectively, the tape supply and take-up reels 16 and 17 located on the one side of the plane of the disk.

Motors (not shown) connected to the supply and take-up reels 16 and 17, respectively, provide continuous tension on the tape through the apparatus. Tension pulleys 23 (FIGURE 1), mounted on spring biased arms 23a, maintain tension on the tape during the starting and stopping of the apparatus. In the interest of greater clarity in the explanation of the operation of the apparatus these arms and pulleys have been omitted in FIGURE 2. FIGURES 2 and 3 illustrate the means provided for driving the tape 11 around the surface 14 of the disk 12. FIGURE 2 shows the means in driving position while FIGURE 3 shows the means in a position wherein the tape is released from contact with a capstan 32, the latter position being used during a threading of the tape through the apparatus. The tape driving means takes the form of a pair of clamping rollers 26 and 27 mounted on supports 28 and 29, respectively, and spring biased by springs 30 and 31 for pressure contact against the capstan 32. The supports 28 and 29 are mounted on pivots 33 and 34, respectively, fixed to the disk 12. The capstan 32 is connected to a motor (not shown) for rotation in direction K for moving the tape through the apparatus. If the capstan motor referred to is of a reversible type, the tape may be driven in either of two directions through the apparatus.

Figure 2:
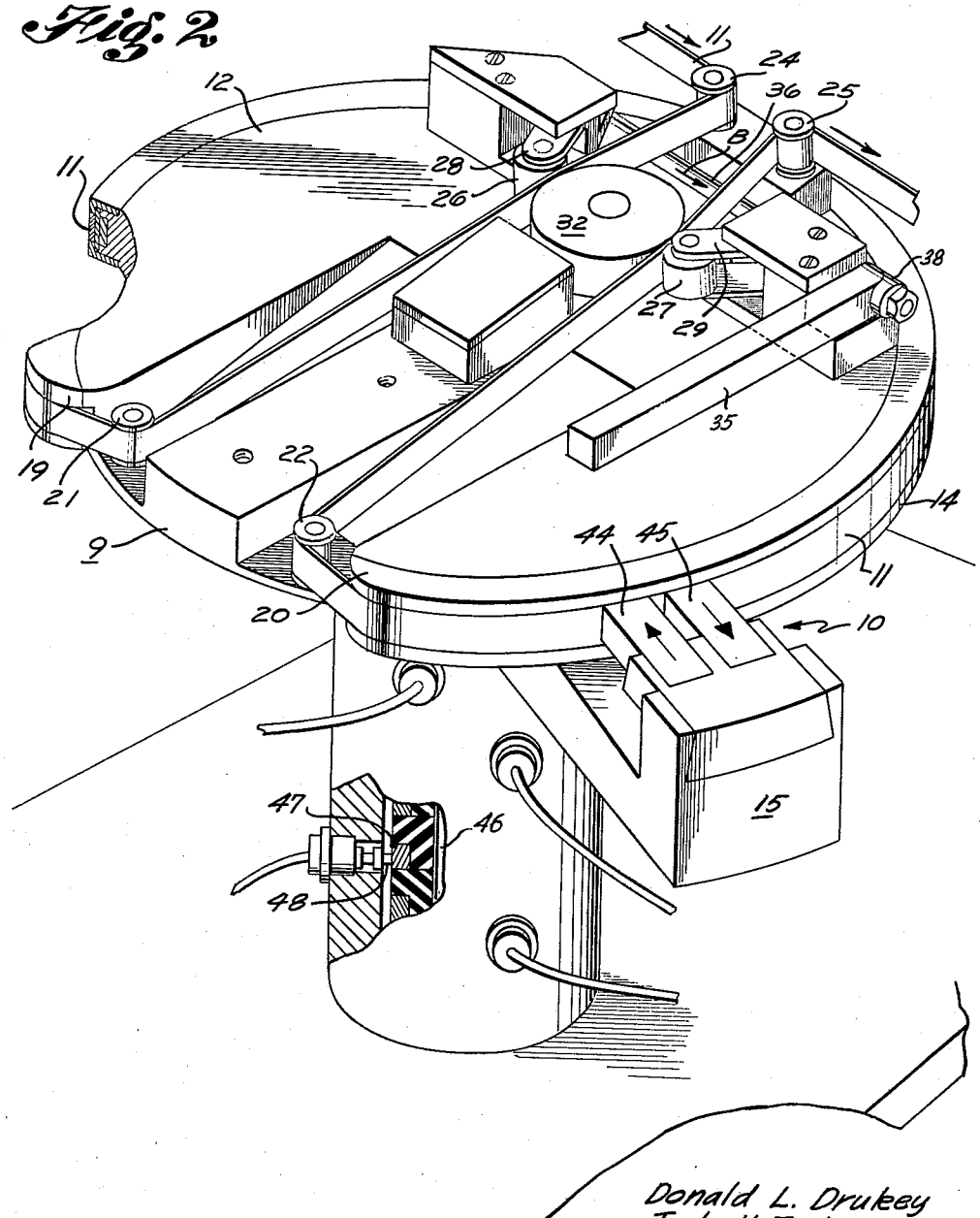
FIGURE 2 is an enlarged perspective view of a part of the apparatus of FIGURE 1.

Means are also provided for moving the clamping rollers 26 and 27 away from the capstan 32, from the "closed" position illustrated in FIGURE 2 to the "open" one illustrated in FIGURE 3, during a threading of the magnetic tape 11 around the disk support surface 14, and for moving the rollers back into spring biased contact against the capstan during operation of the apparatus. A control arm 35 (FIGURE 3) is fixed to a control shaft 36 terminating at one end 38 in a cam follower surface at an oblique angle to the axis of the shaft. The cam follower 37 of the control shaft 36 is arranged to lie in the position illustrated in FIGURE 2 during operation of the apparatus, when tension is required between the clamping rollers 26 and 27 and the capstan 32, and moves in direction B to the position illustrated in FIGURE 3 when the control arm 35 is raised in a direction away from the plane of the support disk 12 (in a direction up, out of the plane of the drawing). When the control shaft 36 moves in direction B it moves a pin 39 fixed to the shaft in the same direction B and against the support 28 of one clamping roller 26. This movement of the control shaft urges the roller 26 in a direction C away from the capstan 32. The movement of the shaft 36 in direction B also effects a movement of an arm 40, fixed to the shaft, in direction B. The movement of the arm 40 in direction B moves a pin 41 fixed to the other support 29 thus moving the other clamping roller 27 in a direction D away from the capstan 32. The springs 30 and 31 aforementioned return the clamping rollers 26 and 27 to their positions against the capstan 32 when the control arm 35 is returned to the position shown in FIGURE 2.

As illustrated in FIGURE 2 the transducing assembly 10 of the apparatus is made up of two transducing heads 44 and 45. One of the heads 44 is a writing or recording head and the other head 45 is a reading or playback head mounted to scan one of the tracks scanned by the recording head 44. The arm 15 is fixed to a spindle 45 for rotation therewith and supports the heads 44 and 45 for movement in an arcuate path adjacent to the disk surface 14 in planes containing the disk support 12 and in contact with the magnetic tape 11 supported on the disk surface.

The spindle 46 is provided with a number of electrical slip rings 47 each positioned to be engaged by a pick-up brush 48. The outputs of the heads 44 and 45 are connected to preamplifiers (not shown) housed within the arm 15, and the outputs of the preamplifiers are connected to the slip rings 47 for connection by means of the brushes 48 to appropriate utilization devices.

Method and System of the Invention

The method and system of the invention will now be described in connection with the block diagram of FIGURE 4 (depicting a bright display system) and the partially schematic diagram of FIGURE 5 (showing a novel recording and integrating system).

According to one aspect of the invention, described in connection with the diagram of FIGURE 4, radar receiver signals are displayed on the screen of a display device such as a cathode ray oscilloscope as a uniformly bright, continuous, slowly changing visual display. The oscilloscope may, for example, be of the well-known plan position indicator variety wherein a radial sweep is used. Radar information signals, w, from the receiver of a known radar set 50, are fed into what is commonly referred to as a slowed down video circuit 65, that is, a circuit for first sampling or integrating radar video data, and then slowing down or stretching out the sampled information, that is, presenting the sampled information at a reduced speed so that the frequency content of the signals is reduced. Such slowed down video arrangements are well known in the art, one such arrangement being realized by the counter 62 and a recording and integrating apparatus 9a to be described in connection with FIGURE 5.

Signals $x$, $y$, and $z$ from this slowed down video circuit are fed into a tape recorder 51. This recorder 51 may be any one of the conventional tape recorders ordinarily used in the art or it may be an intermediate recording apparatus 9b of the type described in connection with FIG. 5. The recorded radar signals x to z recorded on a recording medium such as the tape 11 are then played back on transducing apparatus 9, which is preferably of the type described in connection with FIGURES 1 to 3, and the played back signals are presented to the oscilloscope 52. Thus, the pulses w, received from the radar set 50, are sampled and stretched out into pulses x, y, and z, whereupon they are recorded and presented to the oscilloscope 52 as pulses $x'$ to $z'$.

The recording speed of the tape recorder 51 is preferably chosen such that radar receiver signals received during one radar receiver antenna scan are recorded on the length of tape that can be read by one full scansion (that is, one complete rotation) of the playback assembly 10 (FIGURE 2) of the playback apparatus 9. Thus, if the playback apparatus 9 a 30 inch length of tape can be accommodated for scansion during a single pass of the playback assembly 10 around the tape under scansion, then the speed of the tape through the recorder 51 is chosen to be such that one radar antenna scan is recorded on 30 inches of tape. Thus, if each radar antenna scan takes 4 seconds, the recorder 51 should operate at a tape speed of 7½ inches per second.

As indicated above, the recorded signals are played back on playback apparatus 9 (FIGURE 4) of the type described in connection with FIGURES 1 to 3, and the information signals $x'$ to $z'$ are displayed on the screen of the oscilloscope 52 to which the playback apparatus is connected. In the playback apparatus 9 the tape is moved through the playback apparatus at the same speed as that of the tape through the recording apparatus 51, and is scanned by the playback head at a substantially higher speed than that of the tape through the playback apparatus. The playback reading or scanning speed is at the rate of one revolution of the playback assembly about the tape for each oscilloscope frame to be presented. If 30 oscilloscope frames per second are needed to present a continuous bright display, then the playback assembly is rotated at the rate of 30 revolutions per second. When the tape is slowly advanced through the playback apparatus 9 (at, for example, a speed of 7½ inches per second through the apparatus) the oscilloscope display will change replacing the oldest information with that most recently recorded, the entire display being changed in an antenna scan period. The wave forms shown adjacent to the line connecting the playback apparatus 9 and the oscilloscope 52 illustrate the portions of successive signals $x'$, $y'$, and $z'$, presented to the oscilloscope (and thus the signal portions displayed on the screen of the oscilloscope) during successive playback scansions of the tape in the playback apparatus.

If it is desired to present the start of each oscilloscope frame with its desired position on the oscilloscope screen (for example, if it is desired to always present on an upper portion of the screen signals representative of information coming from a northerly direction) a synchronizing circuit 53 may be connected between the playback apparatus 9 and the oscilloscope 52. This synchronization may be effected by recording a reference signal R on the magnetic tape along with the information signal R, the reference signal R indicating, for example, north, once during each revolution of the radar receiver antenna. This reference signal R may be used to control the oscilloscope sweep to insure a desired correspondence between the signal being presented on the oscilloscope and the oscilloscope screen. Since synchronizing circuits for effecting the foregoing are well known in the art, they will not be further described.

While the foregoing bright display method and system has been described with respect to the use of magnetic transducing apparatus, it is to be understood that other types of recording and playback apparatus may instead be used. However, magnetic transducing apparatus is preferred due to its ease of handling. Also, while the method and system of the invention has been described with respect to the use of an oscilloscope as the display device, it is to be realized that other types of display devices may be substituted for it. For example, a known electroluminescent device may instead be used.

According to another aspect of the invention, described in connection with FIGURE 5, means are provided for presenting as a bright display the information content of signals representative of repetitive phenomena having a large random noise content, even when the noise level in the original signal is higher than the information signal level. The repetitive or cyclic phenomena will be discussed in connection with signals received from a pulse radar set. Each of the cycles to be referred to is the signal received in the time interval between successive radar transmitter pulses. The level of the information signal is increased over that of the noise level by means of the following steps. A first cycle is recorded on magnetic tape. Then the first cycle is played back while the second cycle is arriving. The first and second cycles are then combined and the sum is recorded. This recorded sum is then played back while the third cycle is arriving; the third cycle and the recorded sum are then combined and the new sum is recorded. This process is repeated until the desired number of cycles has been integrated. Since the information content of the cycles will have a substantially repeating pattern, the final integrated signal will contain an information signal with an extremely low random noise level. Thus, a high amplitude information signal may be created from radar signals having a random noise level higher than the information signal level.

The integration arrangement of the invention will, for simplicity of explanation, be described as embodied in apparatus handling the signals in analog form. It is to be appreciated, however, that the signals may instead be handled in digital form to substantially eliminate signal distortion during the several recording and playback operations. To this end the incoming radar signals may be digitally encoded and, after being subjected to the integration referred to, decoded to analog form. Any suitable ones of the known analog-to-digital and digital-to-analog converters may be used in such an arrangement.

As illustrated in FIGURE 5, magnetic tape 11 is fed from a tape supply reel 16, through the recording and integrating apparatus 9a, through the intermediate recording apparatus 9b, then through the playback apparatus 9c, and finally to a tape take-up reel 17. The recording and integrating apparatus 9a and the playback apparatus 9c are each of a type generally similar to the transducing apparatus described with respect to FIGURES 1 to 3. The intermediate recording apparatus 9b is used in providing a slowed down video recording of the integrated signals provided by the integrating apparatus 9a, the integrated signals being spread over a tape length used to accommodate a number (such as 20) of separate unintegrated signals. The intermediate recording apparatus 9b is made up of a shaft 66 (which may be connected to be driven by the shaft 46 of the integrating apparatus 9a) in which a recording head 44b is embedded. A pair of idler rollers 63 and 64, are positioned to maintain the tape 11 closely adjacent to the shaft 66 whereby the recording head 44b will engage the tape 11 in a desired manner. The recording head 44b is connected to the playback head 45a of the integrating apparatus 9a through a counter 62. The counter 62 may be any of the well-known switching circuits (such as a flip-flop counter) constructed to connect desired output signals (for example, every twentieth signal) from a reading or playback head 45a to an intermediate writing or recording head 44b, and to connect all other output signals to a first writing or recording head 44a. The counter 62 may be connected to respond to the separate cycles by being connected to be actuated by successive radar transmitter pulses from the transmitter 67 of the radar set 50. Such signals are normally available from a navigational type radar set for energizing a plan position indicator display tube, with the signals utilized to ensure the establishing of the radial display sweep at a proper instance. Such a synchronizing signal may be counted by the counter 62. On the other hand, an image of the transmitter signal usually passes through the receiver 60 whereby the signal from the receiver would contain an initial pulse indicative of the transmitted pulse, which initial pulse may be counted by the counter 62.

Signals from a radar receiver 60 are fed to the writing or recording head 44a of the integrating apparatus 9a for integrating the radar signals and temporarily recording them on the magnetic tape 11. The reading or playback head 45a is positioned closely adjacent to the recording head 44 for playing back the signals recorded by the recording head 44a, and erase heads 59 are positioned to clean the tape of recorded matter immediately prior to scansion of the tape by the recording heads 44a and 44b of, respectively, the integration apparatus 9a and the intermediate recording apparatus 9b. The two heads 44a and 45a of the integrating apparatus 9a thus form a circulating or recirculating register to be described below. Desired ones of the radar signals recorded on the tape 11 are then picked up from the playback head 45a and are recorded on the tape 11 by a recording head 44b of the intermediate recording apparatus 9b. These desired signals are then played back on the playback apparatus 9c by means of a playback head 45c, the output of the playback head 45c being connected to the oscilloscope 52. The playback apparatus 9c and oscilloscope 52 arrangement of FIGURE 5 may be the same as the one described with respect to FIGURE 4.

In the type of known radar system here referred to a radar antenna (not shown) having an effective angular beam or sector width of 2 degrees makes one 360 degree rotation or scan in four seconds. During the four second antenna rotation the radar transmitter (not shown) sends out about 3600 pulses, or about 20 pulses per 2 degree sector. Since the sector width is 2 degrees, the return information provided from 20 consecutive pulses will present substantially repetitive phenomena. Thus 20 consecutive cycles may be combined to reinforce the substantially common information content of the pulses.

Each of these transmitter pulses has a duration of about one microsecond and provides, in the received radar signal, about 1000 range or return signal elements per transmitter pulse. A radar receiver band width on the order of one megacycle is thus required. These microsecond transmitter pulses give a resolution of about one-tenth mile in range for a radar set having a 100 mile range. Thus, the interval between successive radar pulses is about 1/900 second, that is 1/900 second is allotted for the return of all of the 1000 range elements from each transmitter pulse (900,000 range elements being recorded per second). If information is recorded on the tape 11 by the integration apparatus 9a with a tape wave length of about ½ mil (i.e., ½ mil of tape length is alloated for the recording of each elemental portion of the information to be recorded), the relative speed between the tape and the transducing heads must be 450,000 mils per second or 450 inches per second.

The recording and playback heads 44a and 45a of the integrating apparatus 9a should be effectively spaced apart a distance equal to the tape length required to record the information received during one of the time intervals or cycles referred to. If the tape support disk 12 (FIGURE 1) has a diameter of the order of about 10 inches, the 450 inches per second relative velocity between the head assembly and the tape is realized with about 15 head assembly revolutions per second about the tape support disk, the tape 11 traveling 7½ inches per second in the same direction L as the heads for the reasons indicated above. In other words, with the particular speeds indicated, the spacing between the heads 44a and 45a should be approximately one-half inch (½ mil per element times 1000 range elements per pulse). When the spacing is properly established and the above-mentioned preselected relative speeds are maintained, the signal supplied by the reading head 45a to the recording head 44a will be in phase with and reinforce the adjacent signal information provided by the radar receiver 60.

In operation of the system of FIGURE 5, 20 cycles of radar receiver information (each having 1000 range elements) are integrated to form a single integrated cycle. A first cycle from the radar receiver 60 is recorded on the tape by the recording head 44a during its first ½ inch of tape scansion. There is thus recorded on one section of magnetic tape 11 a signal representative of the information received by the radar receiver 60 during a first of the cycles referred to. The first recorded cycle is then played back during the time that the second cycle of information is arriving. The playback of the first cycle is fed through the counter 62 and is added to the incoming cycle of information at the recording head 44a, and the sum is recorded on a second section of the tape. Thus the second section of tape now carries a combined signal representative of the first and second cycles. Similarly, when the third cycle of information arrives from the radar receiver the composite or integrated first and second signals are played back by the playback head 45a and are added to the new third signal and recorded on a third section of tape. This process is repeated until 20 cycles are thus recorded and integrated. At the beginning of the twenty-first cycle the counter 62 closes a switch which connects the playback head 45a to the recording head 44b of the intermediate recorder 9b, for channeling the final integrated signal to this head; at the same time the twenty-first cycle of information is recorded by the recording head 44a as the first cycle in the next series of 20 cycles. The integrated signal recorded on tape 11 by the recording head 44b of the intermediate apparatus 9b is then played back on the playback apparatus 9c and presented to the oscilloscope 52.

As indicated above, in connection with FIGURE 4, the integrated information must be recorded on the tape 11 by the intermediate recording head 44b in a manner such that information representative of 180 sectors or integrated cycles must be recorded on a tape length of 30 inches (with the tape moving at the rate of 7½ inches per second) in order that an entire four-second radar antenna scan be presented by the playback apparatus 9c to the oscilloscope 52 at one time. Since each integrated cycle must thus occupy ⅙ inch of tape, each of the integrated signals received by the intermediate head 44b must be recorded over this ⅙ inch length of tape. To this end the rotational velocity of the shaft 66 (in a direction opposite that of the tape) is chosen such that the intermediate recording head 44b moves ⅙ inch corresponding to one sector) relative to the tape 11 per 1/900 second and starts each recording (which occurs each 1/45 second) at the same angular orientation. The intermediate head 44b consequently receives an integrated signal during one 1/900 second, during which time the head 44b and tape 11 are disposed in signal transfer relation with respect to each other, and does not receive any signals during the next 44/900 second, during which time the head and tape are out of signal transfer relation. During the one 1/900 second recording time the tape 11 and head 44b have a relative velocity such that the integrated signal from the head is recorded on ⅙ inch of tape. The 7½ inches per second tape speed is effective to move the tape at a rate such that the head 44b starts each of the recordings of the integrated signals at a place on the tape adjacent to the place where the previously recorded signal ends. Thus, no gaps are realized in tape exiting the intermediate recording apparatus 9b. With the 20 integrated pulses being presented to the oscilloscope 52 as a single integrated signal information, a desired slowing down of the video signal is accomplished. By slowing down this video signal the recording and integrating apparatus 9a and the counter 62 operate as one slowed down video circuit means, and provide an integrated signal wherein the data portion of the adjacent signals is cumulative and any random noise within the signals will at least partially average out. When the tape 11 is then subjected to scansion by the playback apparatus 9c the succession of integrated signals will be presented by the playback apparatus to the oscilloscope 52 in the manner described above in connection with FIGURE 4.

If desired, an attenuator (not shown) may be connected between the playback head 45a and the recording head 44a so that the integrating apparatus 9a weights more heavily the most recently received information, the most recently received information accounting for a greater proportion of the integrated signal than the older information.

While for convenience of explanation the integrating apparatus 9a and the playback apparatus 9c have been described as separate mechanisms, it will be appreciated that these two apparatus may be combined by having the integrating and playback functions taking place on two side-by-side channels. In such a case a single tape support disk would be used with the separate tape channels each scanned by an appropriate transducing head assembly. Also, while the intermediate recording apparatus 9b and playback apparatus 9c are shown spaced a distance apart, the lag in presentation of newly integrated information can be decreased by positioning the intermediate recording apparatus 9b closely adjacent to a tape guiding pulley 25c of the playback apparatus.

While in the above example the recirculating register of the invention has been described in connection with a novel integrating apparatus, it will be appreciated that the recirculating register described may be used in other fields, such as in the computer art to replace the conventional magnetic drum recirculating register.

Also, while the invention has been described with respect to the display of low repetition rate phenomena, it will be appreciated that it may also be used to advantage in other applications. Furthermore, methods and systems other than those described with respect to FIGURES 4 and 5 may be used in practicing the invention.

What is claimed is:

1. A system for presenting low repetition rate phenomena as a continuous visual display, comprising: a source of said phenomena; recording means coupled to said source to record on a recording medium signals representative of successive presentations of said phenomena; playback means coupled to said recording means to receive recording medium from said recording means for continually reproducing substantial portions of the signals recorded on said medium; a cathode ray oscilloscope coupled to said playback means for receipt of played back signals therefrom; and means connected between said playback means and said oscilloscope to synchronize each playback of one of said signal portions with the presentation of said signal portions on said oscilloscope; said playback means comprising a disk-like member positioned to support said recording medium for movement in an arcuate path, a spindle mounted for continuous rotation with respect to said member and having an axis of rotation substantially perpendicular to planes containing said arcuate path, and a playback head mounted on said spindle for continuous rotation in a circular path around and including a portion of said arcuate path and positioned to effect scansion of said medium.

2. A system for presenting repetitive phenomena as a continuous visual display, comprising: magnetic tape recording means adapted to record on magnetic tape signals representative of successive presentations of said phenomena; magnetic tape playback apparatus receptive of magnetic tape from said recording means, said apparatus including playback means adapted to repetitively play back predetermined tape portions; a cathode ray oscilloscope coupled to said playback means for receipt of played back signals therefrom; and synchronizing means connected between said playback means and said oscilloscope to synchronize the display of each of the played back portions with the display of previously displayed played back portions to present on said oscilloscope a bright, moving display with the speed of movement of said display relative to said oscilloscope being proportional to the movement of said tape relative to said playback apparatus; said recording means including recirculating register means connected to integrate a plurality of cycles of said repetitive phenomena.

3. A system for presenting repetitive phenomena as a continuous visual display, comprising: magnetic tape recording means adapted to record on magnetic tape signals representative of successive presentations of said phenomena; magnetic tape playback means receptive of magnetic tape from said recording means for continuously playing back portions of said tape; a display device coupled to said playback means for receipt of played back signals therefrom; said recording means comprising a tape support member positioned to support said magnetic tape in an arcuate path around an outside surface thereof, and a recording head and a playback head each mounted adjacent to the other for contact scansion of magnetic tape in said arcuate path and each mounted for movement independent of movement of said tape; said playback head being connected to pass through said recording head at least a portion of the signals recorded on said magnetic tape by said recording head; said recording and playback heads being spaced apart along said arcuate path a distance such that successive cycles of said repetitive phenomena are each adapted to be integrated with a previously recorded cycle.

4. A system for presenting repetitive phenomena as a continuous visual display, comprising: recording means adapted to record on a recording medium signals representative of successive presentations of said phenomena; playback means receptive of recording medium from said recording means for continuously playing back portions of said medium; a cathode ray oscilloscope connected to said playback means for receipt of played back signals therefrom; said recording means including a member positioned to support said recording medium in an arcuate path, and a recording head and a playback head each mounted adjacent to the other for scansion of said recording medium in said arcuate path and each mounted for movement independent of said recording medium; said playback head being connected to pass through said recording head at least a portion of the signals recorded on said recording medium by said recording head, said recording and playback heads being spaced apart along said arcuate path a distance such that successive cycles of said repetitive phenomena are each adapted to be integrated with a previously recorded cycle, thereby to provide in said recording means a recirculating register for integrating signals recorded on said recording medium.

5. A system for presenting repetitive phenomena as a continuous visual display, comprising: magnetic tape recording means adapted to record on magnetic tape signals representative of successive presentations of said phenomena; magnetic tape playback means receptive of magnetic tape from said recording means for continually playing back portions of said tape; a display device coupled to said playback means for receipt of played back signals therefrom; synchronizing means connected between said playback means and said device to present to said device synchronizing signals indicative of the start of the playback of each of said portions; said recording means comprising a disk-like support positioned to support magnetic tape in an arcuate path around an outside surface thereof, and a recording head and a playback head mounted adjacent to each other for scansion of magnetic tape in said arcuate path and mounted for movement independent of said tape; said playback head being connected to pass through said recording head at least a portion of the signal recorded on said magnetic tape by said recording head thereby to provide a recirculating register in said recording means for integrating signals successively recorded on said recording tape; said playback means comprising a disk-like support drum positioned to support magnetic tape in an arcuate path around an outside surface thereof, a spindle mounted for continuous rotational movement with respect to said drum and having an axis of rotation substantially perpendicular to a plane containing said last-named arcuate path, and a playback head mounted on said spindle for continuous rotation in a circular path around and including a portion of said last-named arcuate path and positioned to effect scansion of said tape.

6. A system for presenting repetitive phenomena as a continuous visual display, comprising: magnetic tape recording means adapted to record on magnetic tape signals representative of successive presentations of said phenomena; magnetic tape playback means receptive of magnetic tape from said recording means for continually playing back substantial portions of said tape; a cathode ray oscilloscope connected to said playback means for receipt of played back signals therefrom; means connected between said playback means and said oscilloscope to synchronize the presentation of each of the played back signals on said oscilloscope with the playback of said signals; said recording means comprising a disk-like support positioned to support magnetic tape in an arcuate path around an outside surface thereof, and a recording head and a playback head mounted adjacent to each other for contact scansion of magnetic tape in said arcate path and mounted for movement independent of said tape; said playback head being connected to pass through said recording head at least a portion of the signals recorded on said magnetic tape by said recording head, said recording and playback heads being spaced apart along said arcuate path a distance such that successive cycles of said repetitive phenomena are each adapted to be integrated with a previously recorded cycle thereby to provide, in said recording means, a recirculating register for integrating signals successively recorded on said recording tape; said playback means comprising a disk-like support drum positioned to support magnetic tape in a given plane and in an arcuate path around an outside surface of said drum, a spindle mounted for continuous rotational movement with respect to said support drum and having an axis of rotation substantially perpendicular to said plane, and a playback head mounted on said spindle for continuous rotation in said plane and in a circular path around and including a portion of said last-named arcuate path and positioned to effect scansion of said tape.

7. A recirculating register, comprising: a support disk adapted to support recording tape for travel in a substantially circular path around an outer surface thereof; recording and playback heads mounted adjacent to each other for continuous rotational movement in a common path closely adjacent to and around said substantially circular path and for movement relative to and independent of said tape; said heads and said tape being mounted for movement in a common plane during their movement in said respective paths; and said heads being mounted for contact scansion of said tape and said playback head being connected to play back to said recording head at least a portion of the signal recorded on said tape by said recording head; whereby a recirculating register is provided which has an increased information storage capacity and in which the surface of said tape contacted by said heads is preserved from appreciable wear.

8. In a radar type display system wherein a visual display is subject to loss of brightness because of the limited persistence of the display medium on a cathode ray oscilloscope type display device, and wherein repetitive type phenomena are supplied thereto at a rate which is substantially below that necessary to provide a constant illumination of the display medium, means increasing the effective repetition rate of the phenomena for providing a continuous visual display, comprising: signal slow-down means receptive of a plurality of signals representative of repetitive information, said signal slow-down means being operable to combine data portions of at least two adjacent signals of said plurality of signals and operable to provide periodically an output signal at a rate which is a fraction of the rate of receipt of the plurality of signals and which output signal contains data signal information cumulative of the combined adjacent signals; recording means coupled to said signal slow-down means for recording said output signals contiguously on a continuously movable recording medium; playback apparatus operable concurrently with said recording means and continuously receptive of said recording medium therefrom; playback means within said playback apparatus for continually playing back substantial, continuous and overlapping portions of said recording medium within said playback apparatus; and a display device coupled to said playback means for displaying said output signals received therefrom; said display device and said playback means being synchronized and being driven to provide a repetitive display at a rate substantially greater than the rate of recording of said output signals whereby said display device presents a bright, moving visual display with the speed of the movement of said display relative to said display device being a function of the rate of receipt of the recording medium by said playback apparatus, and with the brightness of the display being a function of the scanning rate of said playback means.

9. A recirculating register comprising: means adapted to support a recording medium for travel in a given path; a recording head and a playback head mounted a predetermined distance from each other for continuous movement in a common path closely adjacent to a portion of said given path and for movement relative to and independent of said recording medium, said heads being mounted for successive contact scansion of said medium with said playback head trailing said recording head by a predetermined distance which distance is a function of the velocity of movement; and electric circuit means connected to said playback head for conducting at least a portion of the recorded signal to the recording head.

10. In a radar type display system wherein a visual display is subject to loss of brightness because of the limited persistence of the display medium on a cathode ray oscilloscope type display device, and wherein repetitive type phenomena are supplied thereto at a rate which is substantially below that necessary to provide a substantially constant illumination of the display medium, means increasing the effective repetition rate of the phenomena for providing a continuous visual display, comprising: means for recording signals representative of an appreciable portion of the repetitive type phenomena on a continuous recording channel at a given recording velocity as a function of the receipt of the repetition type phenomena; means receptive of said channel for re-recording only selected ones of said signals on a recording medium at a substantially lower velocity than said given recording velocity with said recording medium having said selected ones contiguously placed thereon to provide a substantially continuous data signal on said recording medium; a playback apparatus receptive of said recording medium; playback means within said playback apparatus movable relative to said recording medium within said playback apparatus for scanning successive overlapping portions of said recording medium at a velocity different from said given velocity; and means receptive of signals from said playback means for visually displaying the rerecorded signals.

11. Visual display means of the type defined in claim 10 wherein said playback means scans a predetermined portion of said recording medium to provide a signal including a plurality of said selected ones of said signals in a continuous output to said display means.

12. In a radar type display system receptive of repetitive type data signal pulses wherein a visual display is subject to misinterpretation because of the occurrence of random noise conditionally appearing with the data signal pulse and wherein the noise level is conditionally of greater magnitude than at least a portion of the data signal, at least during some operating conditions of the system; means for decreasing the relative strength of the noise level of the signal compared to the data portion, comprising: first means connected to receive the data signal pulses for recording on magnetic tape each of a number of successive such pulses; second means engaging said tape a predetermined time after said first means for detecting each recorded data signal pulse on the magnetic tape, said second means being physically drivingly connected to said first means and spaced a predetermined distance therefrom; means for recording said detected pulse in phase with a subsequently received data signal pulse to provide a succession of integrated data pulses on the magnetic tape; and third means conditionally receptive of a predetermined fractional portion of the integrated data pulses recorded for playing back in-phase data elements of said portion in which the noise level is at least partially averaged out and the relative data portion is a function of the sum of the data portions of a plurality of successive pulses.

13. A recirculating register system, comprising: a disk-like member positioned to support a recording medium for movement in an arcuate path, a spindle mounted for continuous rotation with respect to said member and having an axis of rotation substantially perpendicular to the plane of said arcuate path, recording and playback heads secured adjacent each other on said spindle for continuous rotation in a circular path around and including a portion of said arcuate path so as to effect scansion of said medium, said playback head being connected to play back to said recording head at least a portion of the signal recorded on said medium whereby signals recorded on said medium are rerecorded, a display device, and means coupled between said medium and said display device for selectively displaying said rerecorded signals.

14. A display system comprising means for recording repetitively occurring signals on a record medium at a given recording velocity, means for rerecording selected ones of the signals recorded on said recording medium at a substantially lower velocity than said given recording velocity to provide a substantially continuous signal, a display device, and means coupled between said recording medium and said display means for visually displaying said substantially continuous signal.

15. In a display system for providing a visual display of repetitive type phenomena which occur at a given rate the combination of means for recording signals representative of the repetitive type phenomena on a continuous recording medium at a given recording velocity, a recirculating register coupled to said recording medium for rerecording selected ones of said recorded signals along with signals derived from said repetitive type phenomena, and recording means coupled between said recirculating register and said record medium for recording selected ones of said recording signals on the recording medium at a substantially lower velocity than said given recording velocity to provide a substantially continuous signal on said recording medium, a display device, and playback means coupled between said recording medium and said display device for presenting said substantially continuous signals to said display device whereby a visual representation of signals representing said repetitive type phenomena is provided.

16. Apparatus in accordance with claim 15 in which said playback means includes apparatus movable relative to said recording medium for scanning successive overlapping portions of said recording medium at a velocity different from said given velocity, and means for synchronizing said display device with said scanning apparatus to provide said visual representation.

17. Apparatus in accordance with claim 16 in which said playback means comprises a disk-like member positioned to support said recording medium for movement in an arcuate path, a spindle mounted for continuous rotation with respect to said member and having an axis of rotation substantially perpendicular to a plane containing said arcuate path, and a playback head mounted on said spindle for continuous rotation in a circular path around and including a portion of said arcuate path in a position to effect scansion of said medium.

References Cited in the file of this patent

UNITED STATES PATENTS

| | | |
|---|---|---|
| 1,941,618 | Nemirovsky | Jan. 2, 1934 |
| 2,352,023 | Schuller | June 20, 1944 |
| 2,680,239 | Daniels et al. | June 1, 1954 |
| 2,684,468 | McClure et al. | July 20, 1954 |
| 2,690,473 | Cooley | Sept. 28, 1954 |
| 2,718,356 | Barrell et al. | Sept. 20, 1955 |
| 2,729,803 | Harrison | Jan. 3, 1956 |
| 2,737,646 | Muffly | Mar. 6, 1956 |
| 2,740,952 | Jacobs | Apr. 3, 1956 |
| 2,755,422 | Livingston | July 17, 1956 |
| 2,770,797 | Hamilton | Sept. 8, 1956 |
| 2,773,120 | Masterson | Dec. 4, 1956 |
| 2,786,978 | Warner | Mar. 26, 1957 |
| 2,814,030 | Miller et al. | Nov. 19, 1957 |
| 2,816,157 | Andreas et al. | Dec. 10, 1957 |
| 2,885,485 | Eigen | May 5, 1959 |
| 2,903,521 | Ellison | Sept. 8, 1959 |
| 2,954,166 | Eckdahl | Sept. 27, 1960 |

FOREIGN PATENTS

| | | |
|---|---|---|
| 668,816 | Great Britain | Mar. 11, 1953 |